United States Patent
Shukla et al.

(10) Patent No.: US 9,774,843 B2
(45) Date of Patent: Sep. 26, 2017

(54) METHOD AND APPARATUS FOR GENERATING COMPOSITE IMAGE IN ELECTRONIC DEVICE

(71) Applicant: SAMSUNG ELECTRONICS CO., LTD., Suwon-si (KR)

(72) Inventors: Alok Shankarlal Shukla, Bangalore (IN); Girish Kulkarni, Bangalore (IN); Balvinder Singh, Bangalore (IN); Narasimha Gopalakrishna Pai, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/701,952

(22) Filed: May 1, 2015

(65) Prior Publication Data

US 2015/0319426 A1 Nov. 5, 2015

(30) Foreign Application Priority Data

May 2, 2014 (IN) .................. 2226/CHE/2014(PS)
Apr. 15, 2015 (IN) .................. 2226/CHE/2014(CS)

(51) Int. Cl.
*G09G 5/12* (2006.01)
*H04N 13/02* (2006.01)
(Continued)

(52) U.S. Cl.
CPC ....... *H04N 13/0296* (2013.01); *G06T 1/0007* (2013.01); *G06T 5/50* (2013.01);
(Continued)

(58) Field of Classification Search
CPC .................................................. G06T 1/0007
(Continued)

(56) References Cited

U.S. PATENT DOCUMENTS 5,802,220 A * 9/1998 Black .................. G06K 9/00248
382/100
6,292,218 B1 * 9/2001 Parulski ............... H04N 1/0044
348/220.1
(Continued)

FOREIGN PATENT DOCUMENTS

EP 2328018 A1 6/2011
JP 2012-244245 A 12/2012
(Continued)

OTHER PUBLICATIONS

Communication dated Jul. 30, 2015 by the European Patent Office in related Application No. 15165947.1.

*Primary Examiner* — Javid A Amini
(74) *Attorney, Agent, or Firm* — Sughrue Mion, PLLC

(57) ABSTRACT

A method and an apparatus for generating a composite image in an electronic device are provided. The method includes identifying a first image element of a first event from first images successively captured by a first image sensor of the electronic device, and identifying a second image element of a second event from second images successively captured by a second image sensor of the electronic device, the first images and the second images being simultaneously captured. The method further includes combining the first image element with the second image element based on a synchronization parameter to generate the composite image.

17 Claims, 11 Drawing Sheets

COMPOSITE IMAGE

(51) Int. Cl.
  *H04N 5/232* (2006.01)
  *H04N 9/09* (2006.01)
  *H04N 5/073* (2006.01)
  *G06T 1/00* (2006.01)
  *G06T 5/50* (2006.01)
  *G06T 7/38* (2017.01)

(52) U.S. Cl.
  CPC ............ *G06T 7/38* (2017.01); *H04N 5/0733* (2013.01); *H04N 5/23229* (2013.01); *H04N 5/23232* (2013.01); *H04N 9/09* (2013.01); *H04N 13/0239* (2013.01); *G06T 2207/10004* (2013.01); *G06T 2207/20212* (2013.01)

(58) Field of Classification Search
  USPC .......................................................... 345/634
  See application file for complete search history.

(56) References Cited

U.S. PATENT DOCUMENTS

| | | | | |
|---|---|---|---|---|
| 2006/0061666 A1* | 3/2006 | Kaneko | .............. | H04N 5/23245 348/222.1 |
| 2007/0237514 A1* | 10/2007 | Pillman | .................... | G03B 7/00 396/153 |
| 2007/0279482 A1* | 12/2007 | Oswald | .................. | H04N 7/142 348/14.02 |
| 2008/0031606 A1* | 2/2008 | Zax | ........................ | G03B 29/00 396/56 |
| 2008/0084482 A1* | 4/2008 | Hansson | ............ | H04N 5/23232 348/218.1 |
| 2009/0309990 A1* | 12/2009 | Levoy | ................ | H04N 5/23212 348/222.1 |
| 2010/0086204 A1 | 4/2010 | Lessing | | |
| 2011/0074965 A1* | 3/2011 | Lee | ........................ | H04N 5/232 348/218.1 |
| 2011/0141306 A1* | 6/2011 | Nakano | ................ | H04N 13/025 348/222.1 |
| 2011/0235856 A1* | 9/2011 | Patuck | ............... | H04N 5/23229 382/103 |
| 2012/0057845 A1* | 3/2012 | Obana | ............... | G06F 17/30244 386/241 |
| 2012/0062702 A1* | 3/2012 | Jiang | ........................ | G06T 7/74 348/46 |
| 2012/0127346 A1 | 5/2012 | Sato et al. | | |
| 2012/0243802 A1* | 9/2012 | Fintel | .................. | H04N 5/2625 382/284 |
| 2013/0314561 A1* | 11/2013 | Balannik | .............. | H04N 5/2258 348/222.1 |
| 2014/0043329 A1* | 2/2014 | Wang | ..................... | G06T 17/20 345/420 |
| 2014/0164927 A1* | 6/2014 | Salaverry | ............. | H04N 1/2112 715/727 |
| 2015/0251602 A1* | 9/2015 | Baur | ..................... | B60R 1/00 348/148 |

FOREIGN PATENT DOCUMENTS

| | | |
|---|---|---|
| JP | 2013-146025 A | 7/2013 |
| WO | 2008/040566 A1 | 4/2008 |

* cited by examiner

METHOD AND APPARATUS FOR GENERATING COMPOSITE IMAGE IN ELECTRONIC DEVICE

CROSS-REFERENCE TO RELATED APPLICATIONS

This application claims priority from Indian Patent Application No. 2226/CHE/2014(CS), filed on Apr. 15, 2015, in the Indian Patent Office, and Indian Provisional Patent Application No. 2226/CHE/2014(PS), filed on May 2, 2014, in the Indian Patent Office, the disclosures of which are incorporated herein in their entireties by reference.

BACKGROUND

1. Field

Apparatuses and methods consistent with exemplary embodiments relate to a method and an apparatus for generating a composite image in an electronic device.

2. Description of the Related Art

With the proliferation of various electronic devices and developments in imaging sensors, most electronic devices may be capable of capturing still images and videos. Image sensors in a camera present in the electronic device capture events and display the image data using a display unit of the electronic device.

The existing electronic devices may include a front camera and a back camera. Both the front camera and the back camera can capture images and video based on the camera enabled by a user of the electronic device. The front camera and the back camera generally capture different subjects, and the captured imaged may be managed and stored separately at the electronic device.

In the existing electronic devices, when the front camera and the back camera are simultaneously enabled by the user, a fast switching can be performed between the front camera and the back camera on the electronic device. The fast switching with a time switch allows capturing of the front-and-back 180-degree scenes. However, this method may not simultaneously capture front and back scene images. Further, the existing systems lack a method for displaying the captured front and back scene images simultaneously.

Further in the electronic devices, when the front camera and the back camera are simultaneously enabled by the user, it may be difficult to obtain natural images. The user may need to check the captured images outputted from the front camera and the back camera to determine if the images are captured in the desired form. The user may need to simultaneously check and capture images, which are outputted from the front camera and the back camera.

Thus, there remains a need for a robust system and a robust method for capturing the front scene and back scene images simultaneously and displaying the captured front and back scene images on the electronic device.

SUMMARY

Exemplary embodiments address at least the above problems and/or disadvantages and other disadvantages not described above. Also, the exemplary embodiments are not required to overcome the disadvantages described above, and may not overcome any of the problems described above.

Exemplary embodiments provide a method and an apparatus for generating a composite image in an electronic device.

According to an aspect of an exemplary embodiment, there is provided a method for generating a composite image in an electronic device, the method including identifying a first image element of a first event from first images successively captured by a first image sensor of the electronic device, and identifying a second image element of a second event from second images successively captured by a second image sensor of the electronic device, the first images and the second images being simultaneously captured. The method further includes combining the first image element with the second image element based on a synchronization parameter to generate the composite image.

The combining may include determining a correlation between the first image element and the second image element based on the synchronization parameter, and combining the first image element with the second image element based on the correlation to generate the composite image.

The composite image may include the first image element and the second image element synched together at a same time based on the correlation.

The composite image may include the first image element and the second image element, with a same weight, synched together based on the correlation.

The composite image may include an artificial image element associated with the first image element based on the correlation.

The composite image may include an artificial image element associated with the second image element based on the correlation.

The synchronization parameter may include at least one from among a time stamp of an image element, a weight of the image element, a peak of an event, a degree of importance of the image element, a position of an object, a rate of movement of the object, and emotional characteristics of a user.

The first image sensor may be at least one from among a front camera and a secondary camera.

The second image sensor may be at least one from among a rear camera and a primary camera.

According to an aspect of an exemplary embodiment, there is provided an electronic device for generating a composite image, the electronic device including a processing module configured to identify a first image element of a first event from first images successively captured by a first image sensor of the electronic device, and identify a second image element of a second event from second images successively captured by a second image sensor of the electronic device, the first images and the second images being simultaneously captured. The processing module is further configured to combine the first image element with the second image element based on a synchronization parameter to generate the composite image.

The processing module may be configured to determine a correlation between the first image element and the second image element based on the synchronization parameter, and combine the first image element with the second image element based on the correlation to generate the composite image.

According to an aspect of an exemplary embodiment, there is provided a non-transitory computer-readable storage medium storing a program for generating a composite image in an electronic device, the program including instructions for causing a computer to identify first image element of a first event from first images successively captured by a first image sensor of an electronic device, and identify second image element of a second event from second images successively captured by a second image sensor of the electronic device, the first images and the second images being simultaneously captured. The computer is further caused to combine the first image element with the second image element based on a synchronization parameter to generate the composite image.

BRIEF DESCRIPTION OF THE DRAWINGS

The above and/or other aspects will be more apparent by describing certain exemplary embodiments with reference to the accompanying drawings in which.

DETAILED DESCRIPTION

Figure 1:
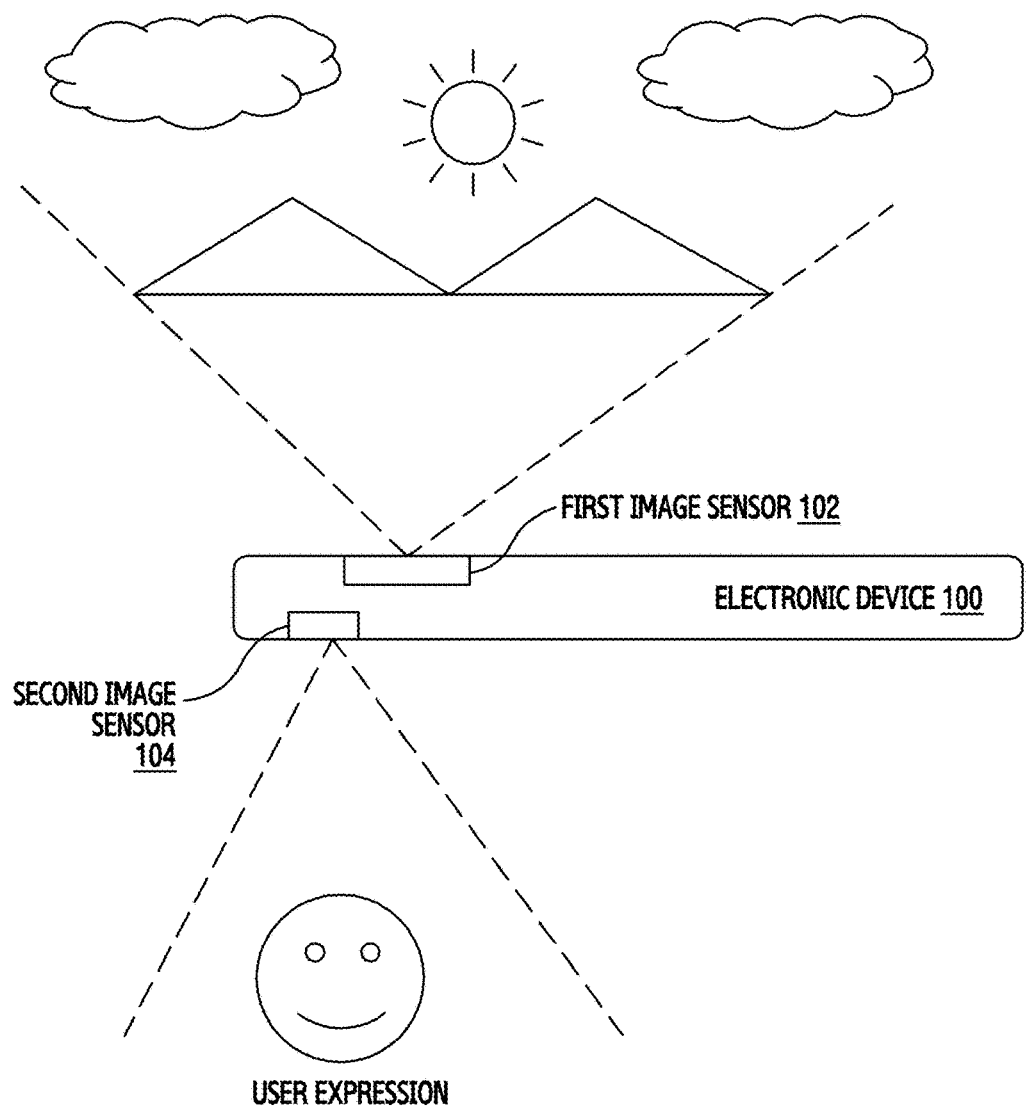
FIG. 1 is a diagram of an electronic device capturing different events simultaneously, according to an exemplary embodiment.

Exemplary embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It will be understood that the terms "comprises" and/or "comprising" used herein specify the presence of stated features or components, but do not preclude the presence or addition of one or more other features or components. In addition, the terms such as "unit", "-er (-or)", and "module" described in the specification refer to an element for performing at least one function or operation, and may be implemented in hardware, software, or the combination of hardware and software.

A method and an apparatus described herein according exemplary embodiments may be robust for generating a composite image by combining one or more first image elements from a first set of images with one or more second image elements from a second set of images. As the first set of images and the second set of images are captured simultaneously by a first image sensor and a second image sensor, the method allows a user to capture natural images of front and back events.

In conventional systems, it may be difficult for a user to simultaneously check and capture images that are outputted from a plurality of image sensors. The user may need to manually switch among the plurality of image sensors to ensure that images are captured in a desired form. Unlike conventional systems and methods, the method and apparatus according to exemplary embodiments provide a mechanism for generating the composite image in an electronic device by combining the one or more first image elements corresponding to a first event with the one or more second image elements corresponding to a second event captured simultaneously by the first image sensor and the second image sensor of the electronic device.

The conventional systems lacks a method for displaying the images captured from a front camera and a back camera simultaneously, whereas the method and apparatus according to exemplary embodiments allow automatic generation of composite images based on a correlation between the captured first event associated with front scene images and the second event associated with back scene images through the front camera and the back camera, respectively.

In an example, the method and apparatus for generating the composite image in the electronic device is as described herein. A user may capture the front event and the back event successively by simultaneously operating the first image sensor and the second image sensor of the electronic device. For example, a burst mode may be enabled for both the first image sensor and the second image sensor of the electronic device for simultaneously capturing the front scene images and the back scene images. The first set of images corresponding to the first event may be captured successively by the first image sensor. Similarly, the second set of images corresponding to the second event may be captured successively by the second image sensor.

In an example, the first event captured by the first image sensor includes a flying bird, and the second event captured by the second image sensor includes expressions of the user while watching the flying bird. The method identifies the first image elements from the flying bird at various time instances from the first set of images, and the method identifies the second image elements from the expressions of the user at various time instances with respect to the flying bird from the second set of images. Further, the method combines the identified bird at various time instances with the user expressions at various time instances to generate the composite image. Thus, the composite image includes one or more first image elements (the flying bird at various time instances) combined with the one or more second image elements (the user expressions at various time instances). Accurate segmentation of multiple second image elements may be done from the one or more second set of images by exploiting motion and face detection techniques before combining the second image elements with the first image element obtained from the first image sensor. Furthermore, the method may be implemented using existing infrastructure and may not require extensive setup and instrumentation.

In an exemplary embodiment, the method and apparatus may also be extended to form a network having a plurality of cameras. A plurality of images may be captured using the plurality of cameras from multiple views. The plurality of images may be combined together to form the composite image.

FIG. 1 is a diagram of an electronic device capturing different events simultaneously, according to an exemplary embodiment. As depicted in FIG. 1, the electronic device 100 includes a first image sensor 102 and a second image sensor 104.

The first image sensor 102 is configured to successively capture a first set of images corresponding to a first event. In an example, the first event may be a sunrise, which is captured by the first image sensor 102 as shown in FIG. 1. In another example, the first event may be any action event such as, but not limited to, a jumping event, a flying event, a dancing event, and so on. The action event may be captured as multiple images or as a video by the first image sensor 102. The first image sensor 102 may successively capture the first set of images corresponding to the first event (the sunrise, in the above example) along with an audio (sound).

The second image sensor 104 is configured to successively capture a second set of images corresponding to a second event. In an example, the second event may be an expression of a user, which is captured by the second image sensor 104 as shown in FIG. 1. In another example, the second event may be any action event such as, but not limited to, a jumping event, a flying event, a dancing event, and so on. The second image sensor 104 may successively capture the second set of images corresponding to the second event (the expression of the user, in the above example) along with an audio (sound).

The first set of images corresponding to the first event and the second set of images corresponding to the second event are simultaneously captured by the first image sensor 102 and the second image sensor 104, respectively.

First image elements corresponding to the first event are identified from the first set of images. In an example, the first image element may be a 'Sun', which may be identified from the first set images captured successively by the first image sensor 102. The first image elements, which include the 'Sun' rising at various time intervals, may be identified from the first set of images. The expression of the user may change continuously with respect to the sunrise captured by the first image sensor 102.

Second image elements corresponding to the second event are identified from the second set of images. In an example, the second image elements may be the expression of the user, which may be identified from the second set of images captured successively by the second image sensor 104.

When the first image elements corresponding to the first event and the second image elements corresponding to the second event are identified, the first image elements are combined with the second image elements using synchronization parameters to generate a composite image. For example, the synchronization parameters may include, but are not limited to, a time stamp of an image element, a weight of the image element, a peak of an event, a degree of importance of the image element, a position of an object, a rate of movement of the object, emotional characteristics of a user, and the like.

In an example, when the first image elements corresponding to the first event and the second image elements corresponding to the second event are identified, a correlation between the identified first image elements and the identified second image elements may be determined based on the synchronization parameters. In an example, if the synchronization parameter is the time stamp, then the identified first image element captured at a time stamp 't1' may be combined with the identified second image element captured at the time stamp 't1'. In a similar manner, the first image element captured at a time stamp 't2' may be combined with the second image element captured at the time stamp 't2'. Thus, the first image elements may be combined with second image elements with their respective time stamps to generate the composite image. In other words, the generated composite image may include the first image elements and the second image elements synched together at the same time based on the correlation.

In FIG. 1, the identified first image element (Sun) captured at the time stamp 't1' is combined with the identified second image element (user expression) at the time stamp 't1' to generate the composite image. In other words, the generated composite image includes the first image elements combined with the second image elements using the synchronization parameters.

In another example, the correlation between the identified first image elements and the identified second image elements may be determined based on the synchronization parameter of the weight. The correlation may be performed between the first image elements and the second image elements based on the weight. The first image elements and the second image elements may be combined based on the weight to generate the composite image. In other words, the generated composite image may include the first image elements and the second image elements with the same weight, synched together based on the correlation.

In an example, the identified first images element may be combined to form a first composite image from the images captured by the first image sensor 102 based on the correlation between the first image elements and the second image elements.

In another example, the identified second images elements may be combined to form a second composite image from the images captured by the second image sensor 104 based on the correlation between the first image elements and the second image elements.

In an example, the first composite image and the second composite image may be fused together to form an action and expression shot. For example, the first composite image may capture actions of kites in the air in a kite competition, while the second composite image may capture expressions of a user at different stage of the kite competition.

In an example, artificial image elements may be included for generating the composite image. The artificial image elements may be included for generating the composite image when there are first image elements that do not have corresponding second image elements based on the determined correlation. The artificial image elements may be included for generating the composite image when there are second image elements that do not have corresponding first image elements based on the determined correlation.

In an example, a user may be capturing a sunset event using the first image sensor 102 and user expressions using the second image sensor 104. Based on a first set of images captured by the first image sensor 102, first image elements may be identified. If a corresponding first image element is not available for a second image element, then an artificial image needs to be introduced for creating a composite image. In other words, if an image of the sun is not available in the captured images and a corresponding user expression is present, the processing unit 106 may introduce an artificial image element (image of the setting sun) for generating the composite image. The processing module 106 may generate some artificial images for unidentified first image elements to generate the composite image.

In a similar manner, in a second set of images captured by the second image sensor 104, if a corresponding user expression is not available for the sunset captured by the first image sensor 102, then an artificial image element (user expression) may be included for generating the composite image. The processing module 106 may generate some artificial images for unidentified second image elements to generate the composite image.

Although the above examples describe the generation of the composite image by correlating the first image elements with the second image elements using the synchronization parameters like the weight and the time stamp of the image element, exemplary embodiments are not limited thereto. Further, the synchronization parameters used for correlating the first image elements with the second image elements may include, but are not limited to, the peak of the event, the degree of importance of the image element, the position of the object, the rate of movement of the object, and the emotional characteristics of the user.

Though FIG. 1 shows the generation of the composite image by correlating the first image elements with the second image elements using the synchronization parameters, exemplary embodiments are not limited thereto. In an exemplary embodiment, the composite image may be generated using either of the first image sensor 102 or the second image sensor 104. In an example, the first image sensor 102 may be configured to successively capture the first set of images corresponding to the first event. The first image elements may be identified from the first set of images captured by the first image sensor 102. Further, the identified first image elements may be fused or combined in a time lapsed manner to generate the composite image.

Figure 2A:
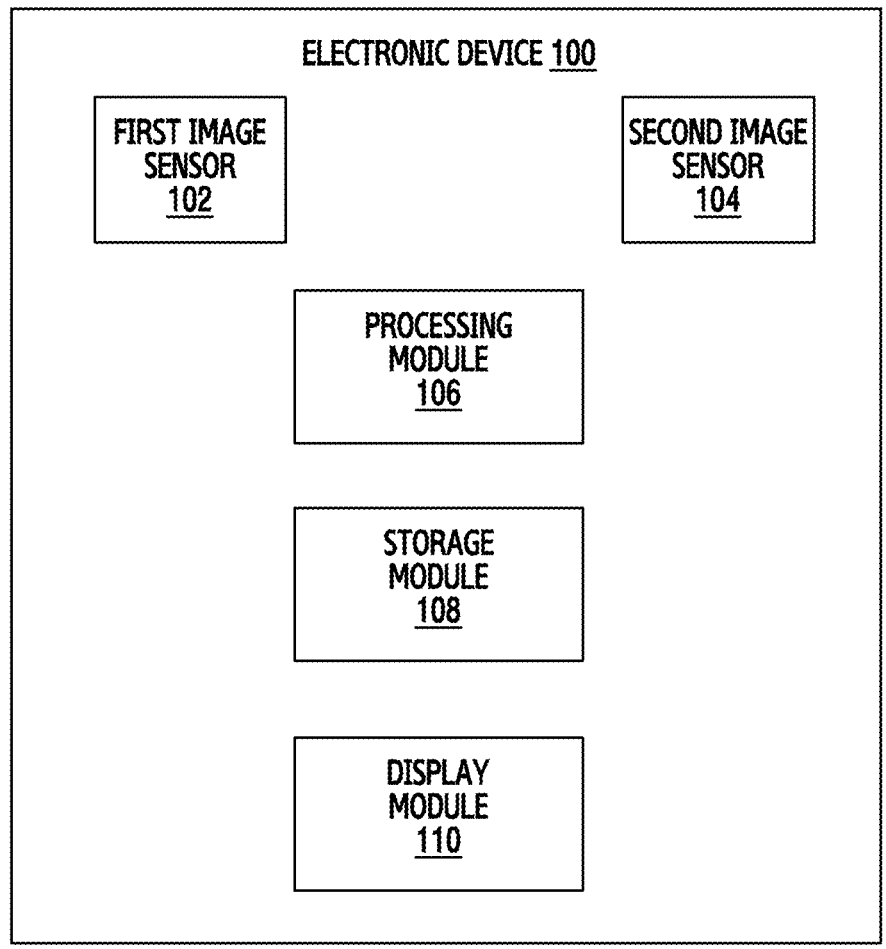
FIGS. 2A and 2B are block diagrams of the electronic device with various modules that generate a composite image, according to exemplary embodiments.
Figure 2B:
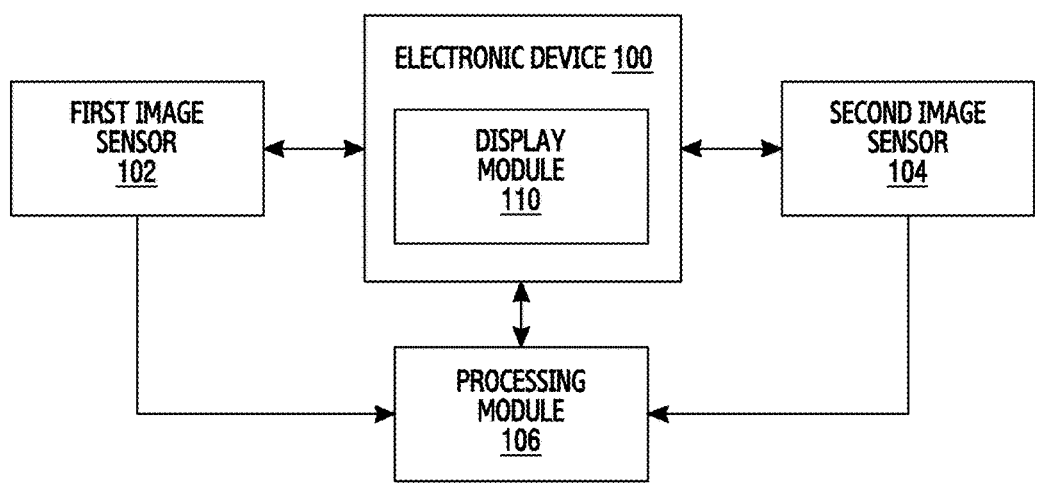

FIGS. 2A and 2B are block diagrams of the electronic device 100 with various modules for generating the composite image, according to exemplary embodiments. As depicted in FIG. 2A, the electronic device 100 includes the first image sensor 102, the second image sensor 104, a processing module 106, a storage module 108, and a display module 110.

The first image sensor 102 is configured to successively capture the first set of images corresponding to the first event. In an example, the first image sensor 102 may be operated in a burst mode for capturing the first set of images corresponding to the first event. The first image sensor 102 may be a front camera or a secondary camera of the electronic device 100.

The second image sensor 104 is configured to successively capture the second set of images corresponding to the second event. In an example, the second image sensor 104 may be operated in the burst mode for capturing the second set of images corresponding to the second event. The second image sensor 104 may be a rear camera or a primary camera of the electronic device 100.

For example, while capturing a sporting event like football, the user may simultaneously capture a game (the first event) and user expressions (the second event) using the first image sensor 102 and the second image sensor 104, respectively. The first image sensor 102 and the second image sensor 104 simultaneously capture the first set of images and the second set of images.

The processing module 106 is configured to perform one or more actions for generating the composite image in the electronic device 100. In an example, the processing module 106 may be configured to obtain the first image elements corresponding to the first event from the first set of images captured by the first image sensor 102. Based on the received first set of images, the processing module 106 may be configured to identify the first image elements from the first set of images obtained from the first image sensor 102.

In an example, the processing module 106 may be configured to obtain the second image elements corresponding to the second event from the second set of images captured by the second image sensor 104. Based on the received second set of images, the processing module 106 may be configured to identify the second image elements from the second set of images obtained from second image sensor 104.

The processing module 106 may be configured to combine the first image elements with the second image elements using the synchronization parameters for generating the composite image, to generate the composite image.

The storage module 108 stores the composite image generated by the processing module 106 before the composite image is rendered on the display module 110.

The display module 110 is configured to include sufficient instruction and interfaces to present a Graphical User Interface (GUI) on the electronic device 100. The display module 110 renders the composite image on the electronic device 100.

In an exemplary embodiment, the first image sensor 102 and the second image sensor 104 may be present external to the electronic device 100 as shown in FIG. 2B. Further, the processing module 106 for generating the composite image may be present external to the electronic device 100.

In an example, the first image sensor 102 and the second image sensor 104 may be configured to send the first set of images and the second set of images (which are captured successively) to a server (which may be present in the cloud) for identifying the first image elements from the first set of images and the second image elements from the second set of images. The server may be configured to combine the first image elements with the second image elements using the synchronization parameters for generating the composite image. The server may generate the composite image, and may send the composite image to the electronic device 100.

Figure 3:
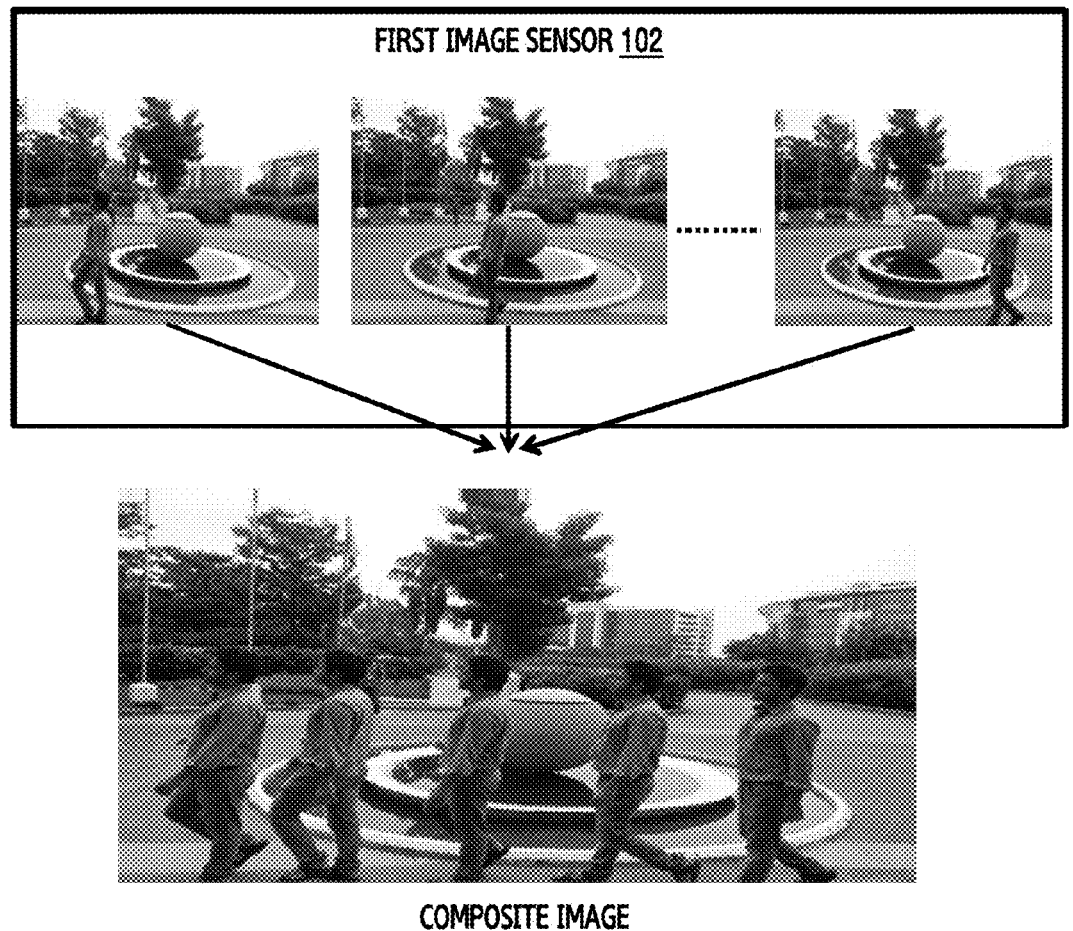
FIG. 3 is a diagram in which a composite image is generated in the electronic device using a sequence of images captured by a first image sensor, according to an exemplary embodiment.

FIG. 3 shows a diagram in which a composite image is generated in the electronic device 100 using a sequence or series of images captured by the first image sensor 102, according to an exemplary embodiment. The first image sensor 102 is configured to successively capture a first set of images corresponding to a first event, in which a man is walking. The processing module 106 may be configured to receive the first set of images, and identify corresponding first image elements from the first set of images. For example, the first image elements include the man walking at various time instances. The processing module 106 may use synchronization parameters like time stamps to ensure seamless fusion of the selected first images elements. Further, the processing module 106 may combine the identified first image elements to generate the composite image as shown in FIG. 3.

For a brief discussion of generating a composite image using a sequence or series of images captured by an imaging sensor, a reference is made to Indian Patent Application No. 2242/CHE/2014, filed on May 5, 2014, entitled "A method and device to compose an image by eliminating one or more moving objects", the disclosure of which is incorporated herein in its entirety by reference.

In another exemplary embodiment, the processing module 106 may combine identified second images elements to form a second composite image from images captured by the second image sensor 104, based on a correlation between the first image elements and the second image elements.

Figure 4A:
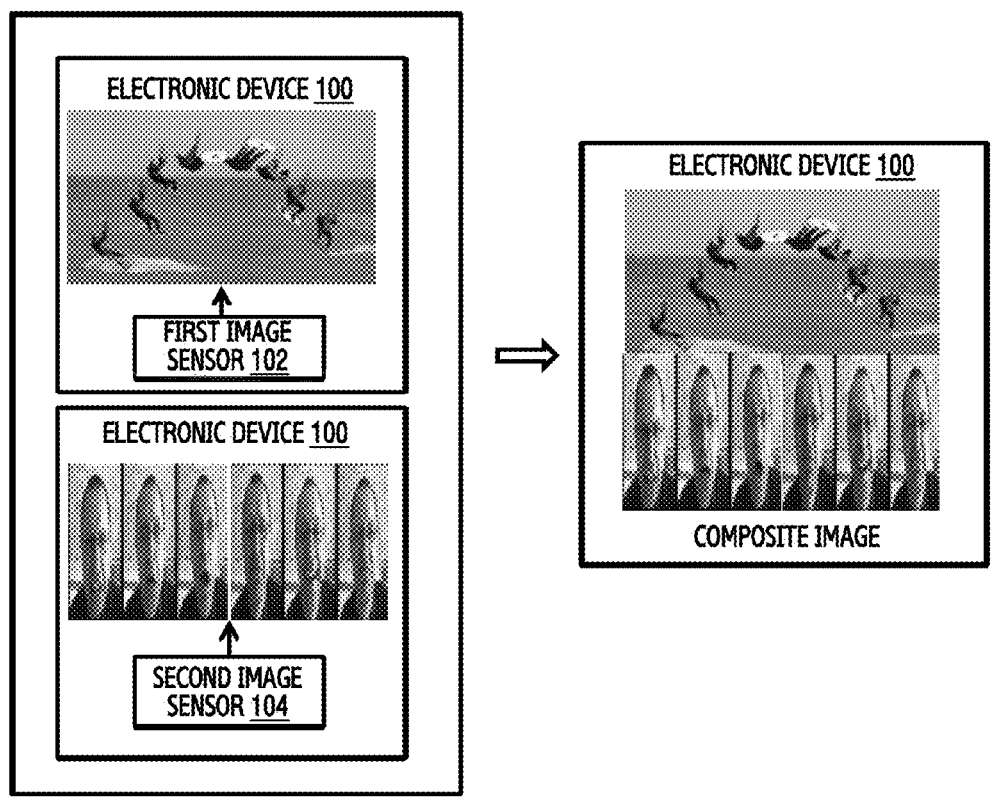
FIGS. 4A-4D are diagrams in which a composite image is generated in the electronic device using the first image sensor and a second image sensor, according to exemplary embodiments.

FIGS. 4A-4D are diagrams in which a composite image is generated in the electronic device 100, using the first image sensor 102 and the second image sensor 104, according to exemplary embodiments. As depicted in FIG. 4A, the first image sensor 102 of the electronic device 100 successively captures a first set of images corresponding to a first event, in which a man is diving in an ocean. The first set of images may be sent to the processing module 106, which may identify first image elements from the first set of images. The first image elements include a diving movement of the man at various time instances.

The second image sensor 104 of the electronic device 100 successively captures a second set of images corresponding to a second event, in which an expression of a user changes at various time instances with respect to the man diving in the ocean. The second set of images may be sent to the processing module 106, which may identify second image elements from the second set of images. The second image elements include the expression of the user at various time instances with respect to the man diving in the ocean.

The processing module 106 may combine the identified first image elements with the identified second image elements to generate a composite image based on a correlation of the identified first image elements and the identified second image elements, using synchronization parameters for generating the composite image. In other words, the electronic device 100 generates the composite image that includes the diving movement of the man at various time instances and the expression of the user at various time instances as shown in FIG. 4A.

Figure 4B:
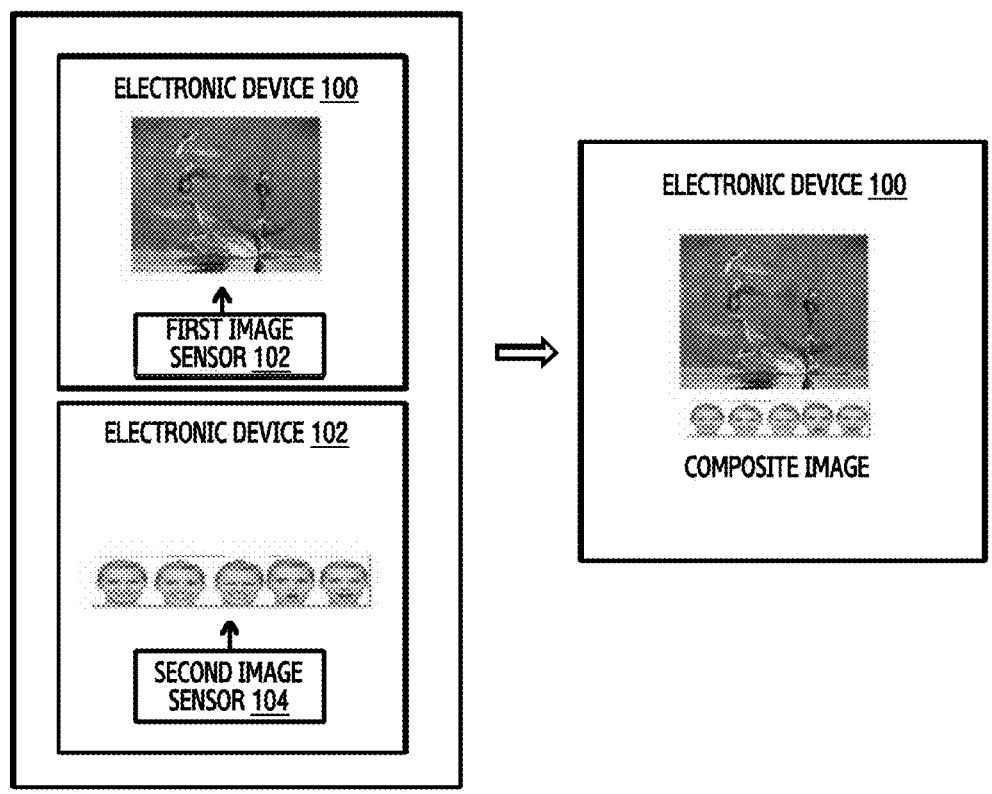

As depicted in FIG. 4B, the first image sensor 102 of the electronic device 100 successively captures a first set of images corresponding to a first event, in which a bird is flying in water. The first set of images may be sent to the processing module 106 that may identify first image elements from the first set of images. The first image elements include a trajectory of the bird in the water at various time instances.

The second image sensor 104 of the electronic device 100 successively captures a second set of images corresponding to a second event, in which an expression of a user changes at various time instances with respect to the bird in the water. The second set of images may be sent to the processing module 106 that may identify second image elements from the second set of images. The second image elements include the expression of the user at various time instances with respect to the trajectory of the bird in the water.

The processing module 106 may combine the identified first image elements with the identified second image elements to generate a composite image based on a correlation of the identified first image elements and the identified second image elements, using the synchronization parameters for generating the composite image. In other words, the electronic device 100 generates the composite image that includes the trajectory of the bird in the water at various time instances and the expression of the user at various time instances as shown in FIG. 4B.

Figure 4C:
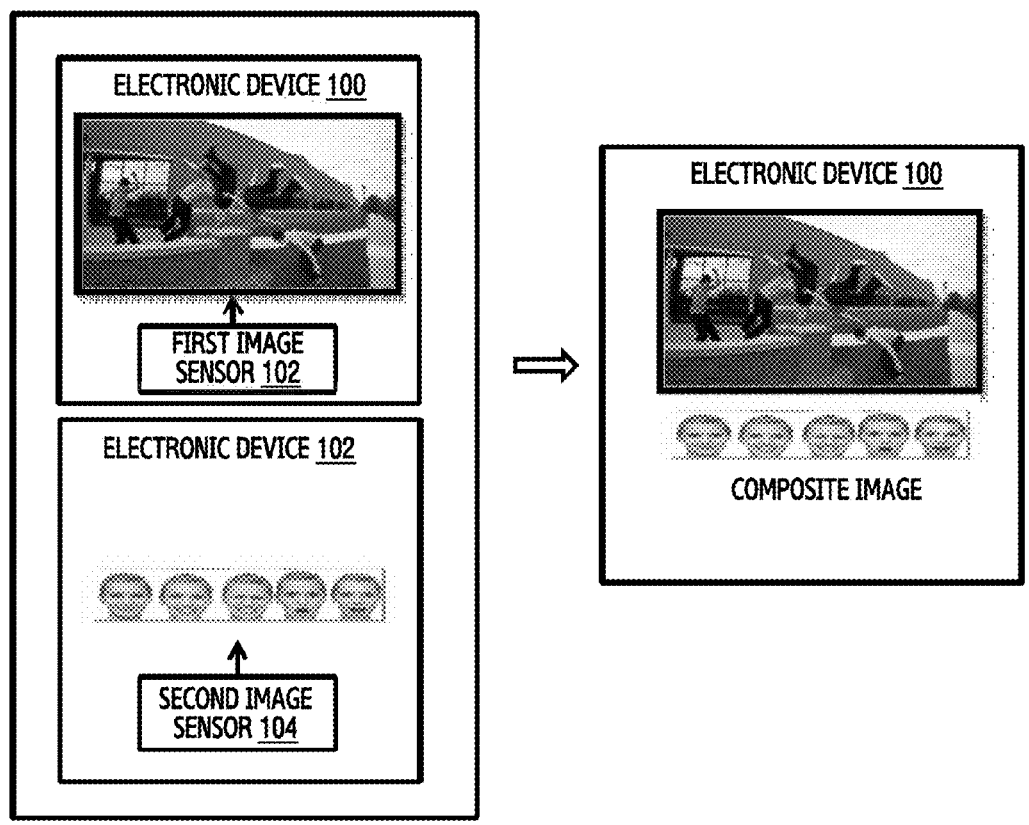

As depicted in FIG. 4C, the first image sensor 102 of the electronic device 100 successively captures a first set of images corresponding to a first event, in which a man is performing some actions while jumping a wall. The first set of images may be sent to the processing module 106 that may identify first image elements from the first set of images. The first image elements include the actions of the man at various time instances.

Further, the second image sensor 104 of the electronic device 100 successively captures a second set of images corresponding to a second event, in which the expression of the user changes at various time instances with respect to the actions of the man. The second set of images may be sent to the processing module 106 that may identify second image elements from the second set of images. The second image elements include the expression of the user at various time instances with respect to the actions of the man.

The processing module 106 may combine the identified first image elements with the identified second image elements to generate a composite image based on a correlation of the identified first image elements and the identified second image elements, using the synchronization parameters for generating the composite image. In other words, the electronic device 100 generates the composite image that includes the actions of the man at various time instances and the expression of the user at various time instances as shown in FIG. 4C.

Figure 4D:
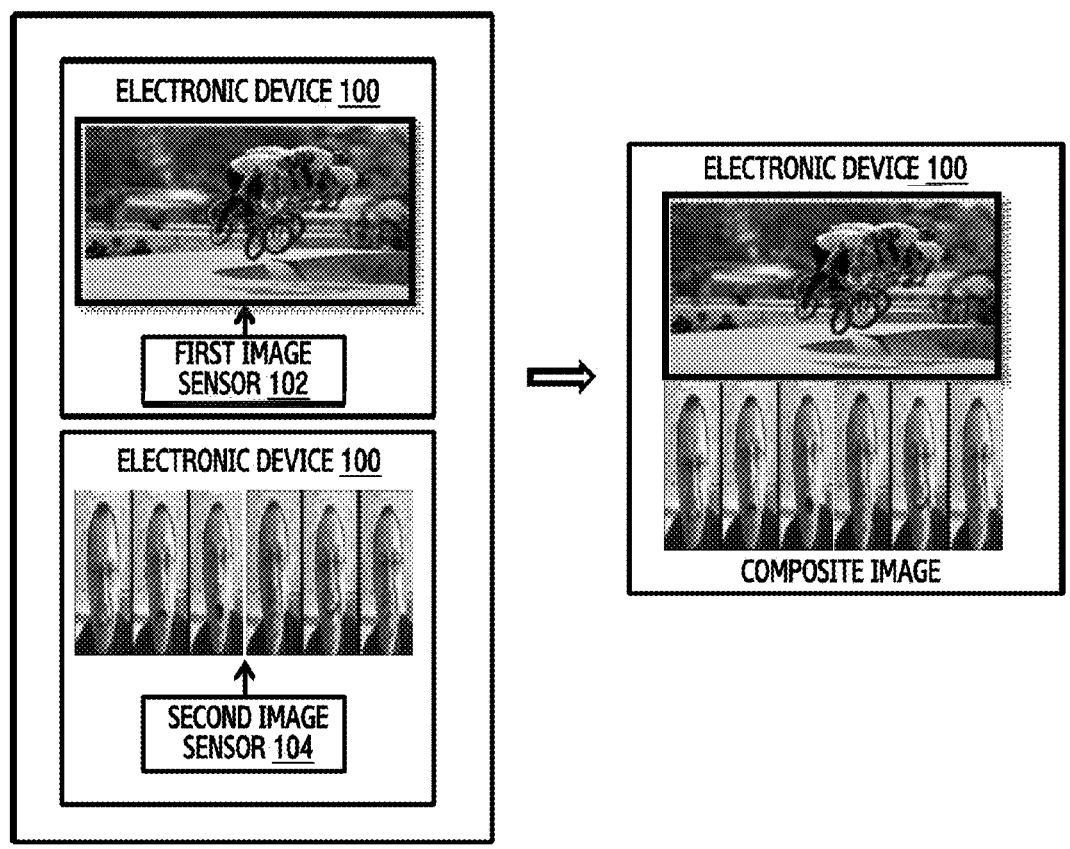

As depicted in FIG. 4D, the first image sensor 102 of the electronic device 100 successively captures a first set of images corresponding to a first event, in which a man performs actions while cycling. The first set of images may be sent to the processing module 106 that may identify first image elements from the first set of images. For example, the first image elements include the actions of the man at various time instances while cycling.

Further, the second image sensor 104 of the electronic device 100 successively captures a second set of images corresponding to a second event, in which the expression of the user changes at various time instances with respect to the actions of the man. The second set of images may be sent to the processing module 106 that may identify second image elements from the second set of images. The second image elements include the expression of the user at various time instances with respect to the actions of the man while cycling.

The processing module 106 may combine the identified first image elements with the identified second image elements to generate a composite image based on a correlation of the identified first image elements and the identified second image elements, using the synchronization parameters for generating the composite image. In other words, the electronic device 100 generates the composite image that includes the actions of the man at various time instances and the expression of the user at various time instances as shown in FIG. 4D.

Figure 5:
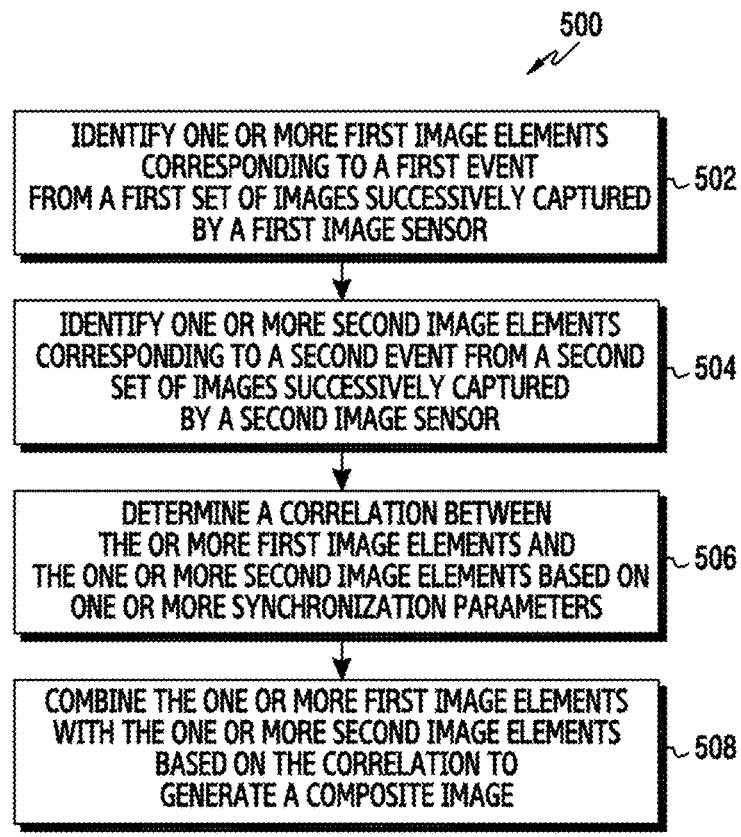
FIG. 5 is a flowchart of a method for generating a composite image in the electronic device, according to an exemplary embodiment.

FIG. 5 is a flowchart of a method 500 for generating a composite image in the electronic device 100, according to an exemplary embodiment. The method 500 and other description described herein provide a basis for a control program, which may be implemented using a microcontroller, microprocessor, or any computer readable storage medium.

At operation 502, the method 500 includes identifying one or more first image elements corresponding to a first event from a first set of images successively captured by the first image sensor 102. The processing module 106 may identify the one or more first image elements corresponding to the first event from the first set of images successively captured by the first image sensor 102.

At operation 504, the method 500 includes identifying one or more second image elements corresponding to a second event from a second set of images successively captured by the second image sensor 104. The processing module 106 may identify the one or more second image elements corresponding to the second event from the second set of images successively captured by the second image sensor 104.

At operation 506, the method 500 includes determining a correlation between the one or more first image elements and the one or more second image elements based on one or more synchronization parameters. The processing module 106 may determine the correlation between the one or more first image elements and the one or more second image elements based on the one or more synchronization parameters.

At operation 508, the method 500 includes combining the one or more first image elements with the one or more second image elements based on the correlation to generate a composite image. The processing module 106 may combine the one or more first image elements with the one or more second image elements based on the correlation to generate the composite image.

The various actions, acts, blocks, operations, and the like in the method 500 may be performed in the order presented, in a different order, or simultaneously. Further, in some exemplary embodiments, some actions, acts, blocks, operations, and the like may be omitted, added, modified, skipped, and the like without departing from scope of the description.

Figure 6:
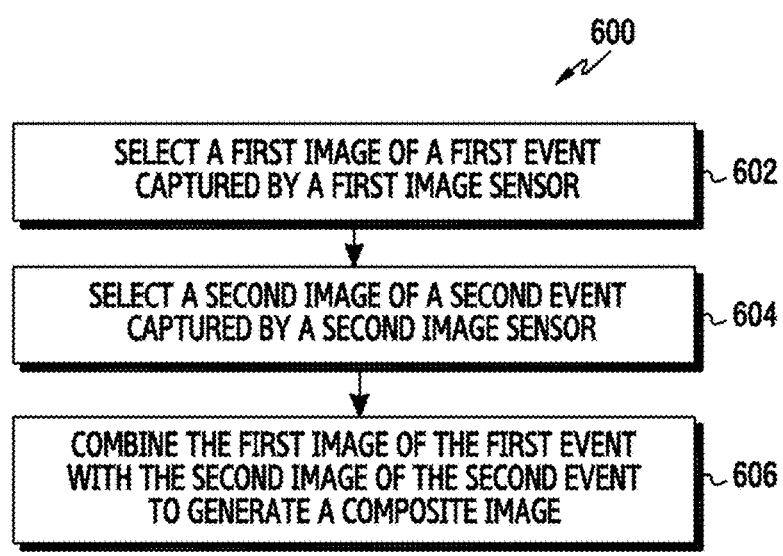
FIG. 6 is a flowchart of a method for generating a composite image in the electronic device, according to another exemplary embodiment.

FIG. 6 is a flowchart of a method 600 for generating a composite image in the electronic device 100, according to another exemplary embodiment. The method 600 and other description described herein provide a basis for a control program, which may be implemented using a microcontroller, microprocessor, or any computer readable storage medium.

At operation 602, the method 600 includes selecting a first image of a first event captured by the first image sensor 102. The processing module 106 may select the first image of the first event captured by the first image sensor 102.

At operation 604, the method 600 includes selecting a second image of a second event captured by the second image sensor 104. The processing module 106 may select the second image of the second event captured by the second image sensor 104.

At operation 606, the method 600 includes combining the first image of the first event with the second image of the second event to generate a composite image. The processing module 106 may combine the first image of the first event with the second image of the second event to generate the composite image.

The various actions, acts, blocks, operations, and the like in the method 600 may be performed in the order presented, in a different order, or simultaneously. Further, in some exemplary embodiments, some actions, acts, blocks, operations, and the like may be omitted, added, modified, skipped, and the like without departing from scope of the description.

Figure 7:
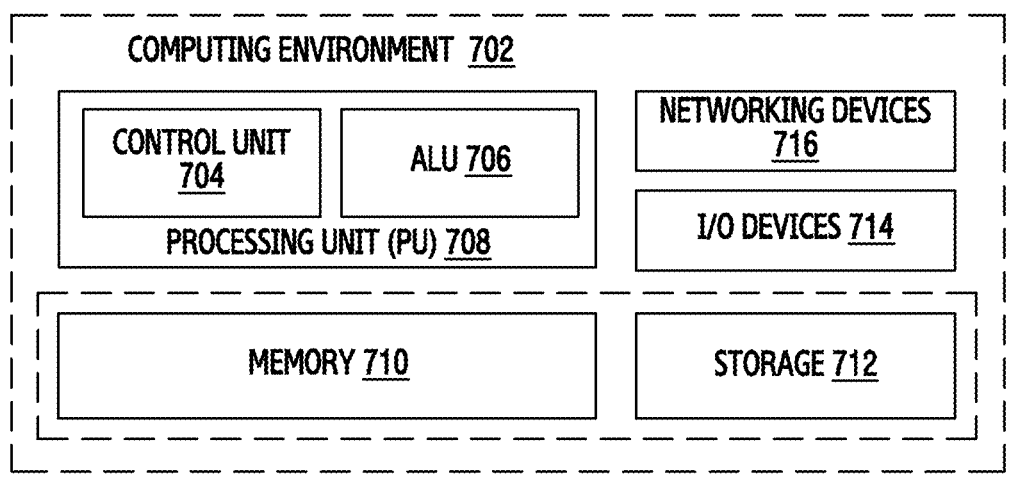
FIG. 7 is a block diagram of a computing environment implementing the method for generating a composite image in the electronic device, according to an exemplary embodiment.

FIG. 7 illustrates a computing environment 702 implementing the method 500 or 600 for generating a composite image in the electronic device 100, according to an exemplary embodiment. As depicted, the computing environment 702 includes at least one processing unit 608 that is equipped with a control unit 704 and an Arithmetic Logic Unit (ALU) 706, a memory 710, a storage 712, plurality of networking devices 716, and a plurality input/output (I/O) devices 714. The processing unit 708 is responsible for processing instructions of a technique. The processing unit 708 receives commands from the control unit 704 in order to perform its processing. Further, any logical and arithmetic operations involved in the execution of the instructions are computed with the help of the ALU 706.

The overall computing environment 702 may be composed of multiple homogeneous and/or heterogeneous cores, multiple CPUs of different kinds, special media, and other accelerators. Further, the processing unit 708 may include a plurality of processing units located on a single chip or over multiple chips.

The technique including of instructions and codes needed for implementation may be stored in either the memory 710, the storage 712, or both. At a time of execution, the instructions may be fetched from the corresponding memory 710 and/or storage 712, and executed by the processing unit 708.

In case of any hardware implementations, various types of the networking devices 716 and/or the external I/O devices 714 may be connected to the computing environment 702 to support the implementation through a networking unit and an I/O device unit.

In addition, the exemplary embodiments may also be implemented through computer-readable code and/or instructions on a medium, e.g., a computer-readable medium, to control at least one processing element to implement any above-described embodiments. The medium may correspond to any medium or media which may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for generating a composite image in an electronic device, the method comprising:
   capturing, by a first image sensor, first images of a first object at a plurality of successive times;
   capturing, by a second image sensor, second images of a second object at a plurality of successive times;
   combining the first images into a first composite image comprising a plurality of first image elements of the first object in the first images on a common background of the first images;
   combining the second images into a second composite image comprising a plurality of second image elements of the second object; and
   generating a third composite image by combining the first composite image with the second composite image, based on the plurality of successive times,
   wherein the plurality of the first image elements is disposed on each of different positions, and
   wherein the each of the different positions correspond to the plurality of successive times.

2. The method of claim 1, wherein the generating of the third composite image comprises:

determining a correlation between the plurality of first image elements in the first images and the plurality of second image elements in the second images, based on at least one of a weight of an image element, a peak of an event, a degree of importance of the image element, a position of an object, a rate of movement of the object, and emotional characteristics of a user; and combining first composite image with the second composite image, based on the correlation to generate the third composite image.

3. The method of claim 2, wherein the third composite image comprises the plurality of first image elements and the plurality of second image elements synched together at a same time based on the correlation.

4. The method of claim 2, wherein the third composite image comprises the plurality of first image elements and the plurality of second image elements, with a same weight, synched together based on the correlation.

5. The method of claim 2, wherein the third composite image comprises an artificial image element associated with the plurality of first image elements based on the correlation.

6. The method of claim 2, wherein the third composite image comprises an artificial image element associated with the plurality of second image elements based on the correlation.

7. The method of claim 1, wherein the first image sensor is at least one from among a front camera and a secondary camera, and
wherein the second image sensor is at least one from among a rear camera and a primary camera.

8. An electronic device for generating a composite image, the electronic device comprising:
a first image sensor configured to capture first images of a first object at a plurality of successive times;
a second image sensor configured to capture second images of a second object at the plurality of successive times; and
a processor configured to:
combine the first images into a first composite image comprising a plurality of first image elements of the first object in the first images on a common background of the first images;
combine the second images into a second composite image comprising a plurality of second image elements of the second object; and
generate a third composite image by combining the first composite image with the second composite image, based on the plurality of successive times,
wherein the plurality of the first image elements is disposed on each of different positions, and
wherein the each of the different positions correspond to the plurality of successive times.

9. The electronic device of claim 8, wherein the processor is further configured to:
determine a correlation between the plurality of first image elements in the first images and the plurality of second image elements in the second images, based on at least one of a weight of an image element, a peak of an event, a degree of importance of the image element, a position of an object, a rate of movement of the object, and emotional characteristics of a user, in the combined first images and the combined second images; and
combine the first composite image with the second composite image, based on the correlation to generate the third composite image.

10. The electronic device of claim 9, wherein the third composite image comprises the plurality of first image elements and the plurality of second image elements synched together at a same time based on the correlation.

11. The electronic device of claim 9, wherein the third composite image comprises the plurality of first image elements and the plurality of second image elements, with a same weight, synched together based on the correlation.

12. The electronic device of claim 9, wherein the third composite image comprises an artificial image element associated with the plurality of first image elements based on the correlation.

13. The electronic device of claim 9, wherein the third composite image comprises an artificial image element associated with the plurality of second image elements based on the correlation.

14. The electronic device of claim 8, wherein the first image sensor is at least one from among a front camera and a secondary camera, and
wherein the second image sensor is at least one from among a rear camera and a primary camera.

15. A non-transitory computer-readable storage medium storing a program for generating a composite image in an electronic device, the program comprising instructions for causing a computer to:
capture, by a first image sensor, first images of a first object at a plurality of successive times;
capture, by a second image sensor, second images of a second object at the plurality of successive times;
combine the first images into a first composite image comprising a plurality of first image elements of the first object in the first images on a common background of the first images;
combine the second images into a second composite image comprising a plurality of second image elements of the second object; and
generate a third composite image by combining the first composite image with the second composite images, based on the plurality of successive times,
wherein the plurality of the first image elements is disposed on each of different positions, and wherein the each of the different positions correspond to the plurality of successive times.

16. The method of claim 1, wherein the plurality of second image elements of the second object comprises different faces of a user of the electronic device that correspond to the plurality of successive times.

17. The electronic device of claim 8, wherein the plurality of second image elements of the second object comprises different faces of a user of the electronic device that correspond to the plurality of successive times.

* * * * *